(12) United States Patent
Shahar et al.

(10) Patent No.: US 9,258,059 B2
(45) Date of Patent: Feb. 9, 2016

(54) NON-SEMAPHORE LINKED LIST MANAGEMENT

(71) Applicant: Broadcom Corporation, Irvine, CA (US)

(72) Inventors: Boaz Shahar, Raanana (IL); Oren Wolach, Kfar Saba Ce (IL); David Avishai, Nes Ziona (IL)

(73) Assignee: Broadcom Corporation, Irvine, CA (US)

( * ) Notice: Subject to any disclaimer, the term of this patent is extended or adjusted under 35 U.S.C. 154(b) by 384 days.

(21) Appl. No.: 13/731,941

(22) Filed: Dec. 31, 2012

(65) Prior Publication Data

US 2014/0186053 A1     Jul. 3, 2014

(51) Int. Cl.
*H04B 10/00* (2013.01)
*H04B 10/25* (2013.01)
*H04L 12/883* (2013.01)

(52) U.S. Cl.
CPC ............ *H04B 10/25* (2013.01); *H04L 49/9015* (2013.01)

(58) Field of Classification Search
CPC ........ H04B 10/40; H04B 10/50; H04B 10/43; H04J 14/023; H04J 14/0232; H04J 14/0235; H04J 14/0239; H04J 14/0242; H04J 14/0245; H04J 14/0249; H04J 14/025; H04J 14/0252; H04J 29/0653
USPC ......... 398/66, 67, 68, 70, 71, 72, 98, 99, 100, 398/135, 136, 138, 139, 58; 370/352, 392, 370/389, 468, 474, 465
See application file for complete search history.

(56) References Cited

U.S. PATENT DOCUMENTS 7,852,880 B2 * 12/2010 Solomon et al. ............... 370/498
8,942,560 B2 *  1/2015 Hirth et al. ...................... 398/71

* cited by examiner

*Primary Examiner* — Hanh Phan
(74) *Attorney, Agent, or Firm* — Sterne, Kessler, Goldstein & Fox P.L.L.C.

(57) ABSTRACT

Methods, systems, and computer program products are provided for inserting the packet into a tail of a linked list buffer, and the linked list buffer includes a plurality of Buffer Descriptors (BD), a HEAD pointer pointing to a null Buffer Descriptor (NullBD) and a NULLBD pointer. The NULLBD pointer is switched to point to the NullBD and the HEAD pointer to point to a valid BD which represents a memory address of payload data in the packet to be transmitted. Upon transmission of the packet, the HEAD pointer is converted to point to the NullBD and the NULLBD pointer to point to the valid BD. The valid BD pointed by the NULLBD pointer is finally transferred to a free linked list buffer so that the NULLBD pointer points to no memory address.

20 Claims, 9 Drawing Sheets

NON-SEMAPHORE LINKED LIST MANAGEMENT

FIELD

The present disclosure relates generally to packet processing and buffer management in a communication network.

BACKGROUND

Background Art

Network devices, such as switches and routers, are designed to forward network traffic, in the form of packets. Special-purpose processors known as network processors have been developed to efficiently process very large numbers of packets per second. A linked list is classical data structure in buffer management in a communication network. The elements of the linked list buffer in this context are called Buffer Descriptors (BD), which points to a memory space called a Data Buffer (DBUF).

An Ingress State Machine (ISM) or Egress State Machine (ESM) invokes independent processes and acts as receiver or transmitter of the packets respectively. Given that the DBUF can both contain packets for transmission and serve as a placeholder for packets to be received, a transmitter and a receiver may access the linked list buffer simultaneously. In the event that they operate on the same element, particularly when there is only one element in the linked list buffer, conflict arises that may cause the malfunction of the entire system. The problem is exacerbated in a GPON (Gigabit Passive Optical Network), such as an XGPON system, which is capable of delivering shared Internet access rates up to 10 Gbit/s (gigabits per second) over existing passive optics.

Some conventional systems attempt to address these resource contention issues via a semaphore based or an arbitrated solution. However, both solutions result in non-deterministic performance estimation due to a random approach used for performance analysis. Furthermore, in the arbitrated solution, additional hardware is required to interact with the ISM and ESM. As a result, such conventional systems fail to provide an ideal deterministic approach to allow the continuous operations of the machines without performance degradation and complexity of additional hardware.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described wall reference to the accompanying drawings. Generally, the drawing in which an element first appears is typically indicated by the leftmost digit(s) in the corresponding reference number.

DETAILED DESCRIPTION OF EMBODIMENTS

I. Introduction

The following detailed description refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, and within the scope and spirit of the present invention.

The present disclosure relates to a system including a reception and a transmission machine. The reception machine is configured to receive a packet for transmission and insert the packet into a tail of a transmit queues linked list buffer, wherein the transmit queues linked list buffer has a plurality of Buffer Descriptors (BD), a HEAD pointer pointing to a null Buffer Descriptor (NullBD) and a NULLBD pointer. The transmission machine is configured to switch the NULLBD pointer to point to the NullBD and the HEAD pointer to point to a valid BD which represents a memory address of payload data in the packet to be transmitted. Upon transmission of the packet, the transmission machine is configured to convert the HEAD pointer to point to the NullBD and the NULLBD pointer to point to the valid BD. Finally, the transmission machine is configured to transfer the valid BD pointing by the NULLBD pointer to a free linked list buffer so that the NULLBD pointer points to no memory address.

The present disclosure also relates to a system for data transmission by an Optical Network Unit (ONU) including a reception and a transmission machine. The reception machine is configured to receive a packet for transmission to an Optical Line Terminal (OLT) and insert the packet into a tail of a transmit queues linked list buffer, wherein the transmit queues linked list buffer has a plurality of Buffer Descriptors (BD), a HEAD pointer pointing to a null Buffer Descriptor (NullBD) and a NULLBD pointer. The transmission machine is configured to switch the NULLBD pointer to point to the NullBD and the HEAD pointer to point to a valid BD which represents a memory address of payload data in the packet to be transmitted. Upon transmission of the packet, the transmission machine is configured to convert the HEAD pointer to point to the NullBD and the NULLBD pointer to point to the valid BD. Finally, the transmission machine is configured to transfer the valid BD pointed by the NULLBD pointer to a free linked list buffer so that the NULLBD pointer points to no memory address.

According to a further embodiment of the invention, there is provided a method including inserting the packet into a tail of a linked list buffer, wherein the linked list buffer includes a plurality of Buffer Descriptors (BD), a HEAD pointer pointing to a null Buffer Descriptor (NullBD) and a NULLBD pointer; switching the NULLBD pointer to point to the NullBD and the HEAD pointer to point to a valid BD which represents a memory address of payload data in the packet to be transmitted; upon transmission of the packet, converting the HEAD pointer to point to the NullBD and the NULLBD pointer to point to the valid BD; and transferring the valid BD pointed by the NULLBD pointer to a five linked list buffer so that the NULLBD pointer points to no memory address.

Additional embodiments of the invention include a computer-readable storage device having computer-executable instructions stored thereon, execution of which, by a computing device, causes the computing device to perform operations comprising receiving a packet for transmission; inserting the packet into a tail of a linked list buffer, wherein the linked list buffer includes a plurality of Buffer Descriptors (BD), a HEAD pointer pointing to a null Buffer Descriptor (NullBD) and a NULLBD pointer; switching the NULLBD pointer to point to the NullBD and the HEAD pointer to point to a valid BD which represents a memory address of payload data in the packet to be transmitted; upon transmission of the packet, converting the head pointer to point to the NullBD and the NULLBD pointer to point to the valid BD; and transferring the valid BD pointing by the NULLBD pointer to a free linked list buffer so that the NULLBD pointer points no memory address.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

II. Transmit Queues Linked List Buffer

Figure 1:
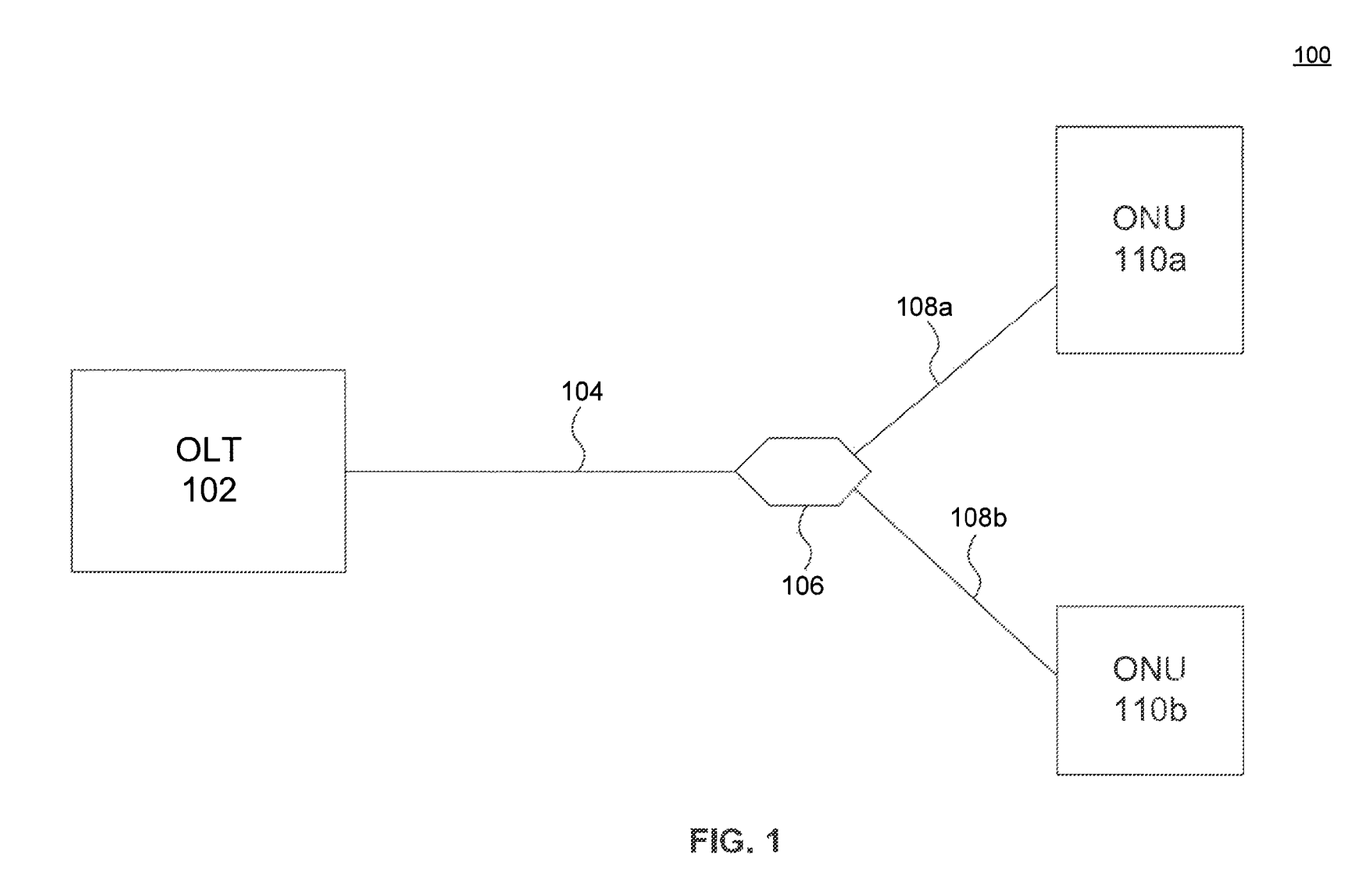
FIG. 1 illustrates an example Gigabit Passive Optical Network (GPON).

FIG. 1 illustrates an example Gigabit Passive Optical Network (GPON) 100. Example GPON 100 is provided for the purpose of illustration only and is not limiting of embodiments of the present disclosure. A Passive Optical Network (PON) is a single, shared optical fiber that uses inexpensive optical splitters to divide a single fiber into separate strands feeding individual subscribers. A XGPON is a PON which is capable of delivering shared Internet access rates up to 10 Gbit/s (gigabits per second) over existing passive optics networks. XGPONs provide simple, easy-to-manage connectivity both at customer premises and at the central office. As with other Gigabit Ethernet media, XGPONs are well-suited to carry packetized traffic.

As shown in FIG. 1, example GPON 100 includes an Optical Line Terminal (OLT) 102, an optical passive splitter 106, and Optical Network Units (ONUs) 110a and 110b. OLT 102 can sit at a central office (CO) of the network and is coupled to a fiber optic line 104. ONUs 110a and 110b are typically locate near end user subscribers. Optionally, passive unpowered splitter 106 can be used to split fiber optic line 104 into a plurality of fiber optic lines 108a-b. This allows multiple subscribers, such as ONUs 110a and 110b, which may be in different geographical areas, to be served by the same OLT 102 in a point-to-multipoint topology. ONUs 110a-b may each serve one or more end user devices (not shown in FIG. 1).

GPON system 100 may provide high bandwidth, all-service solutions to its subscribers. These services typically include a bundle of TV broadcasting, Internet, and telephone services. ONUs 110a-b may be connected to a residential gateway installed in the premises. The gateways may be further coupled to, for example, a telephone device, a TV set-top box, or, a computer to provide Internet connectivity. Generally, a residential gateway may provide the functionality of a modem and router and may serve as, for example, a cable modem, a router, a switch, a wireless modem, a wireless router, and so on.

Example GPON system 100 may facilitate bi-directional communication over single fiber optic line 104. Downstream signals are broadcasted to all premises sharing multiple fibers. To separate upstream and downstream signals of multiple users over fiber optic line 104, GPON system 100 may adopt, for example, two multiplexing mechanisms: wavelength-division multiplexing and time-division multiplexing. With wavelength-division multiplexing, each customer transmits their signal using a unique wavelength. With time-division multiplexing (TDM), the customers "take turns" transmitting information. For example, ONUs 110a-b share fiber optic line 104 in a time division multiplexing (TDM) manner for upstream communication to OLT 102. OLT 102 "ranges" the ONUs 110a and 110b in order to provide time slot assignments for upstream communication.

Although FIG. 1 illustrates a tree topology, a PON can also be based on other topologies, such as a logical ring or a logical bus. Notably, although many examples of the present disclosure are based on GPONs, embodiments of the present disclosure are not limited to GPONs and can be applied to a variety of PONs, such as ATMPONs (APONs), Ethernet PONs (EPONs), wavelength division multiplexing (WDM) PONs, and time division multiplexing (TDM) PONs, or networks, such as DOCIS, Ethernet, etc.

Embodiments will now be described with respect to exemplary transmit queues linked list buffer and free linked list buffer implementations. These implementations are provided for the purpose of illustration only and are not limiting. As would be understood by a person of skill in the art based on the teachings herein, embodiments may be implemented in a variety of other ways without departing from their scope.

Figure 2:
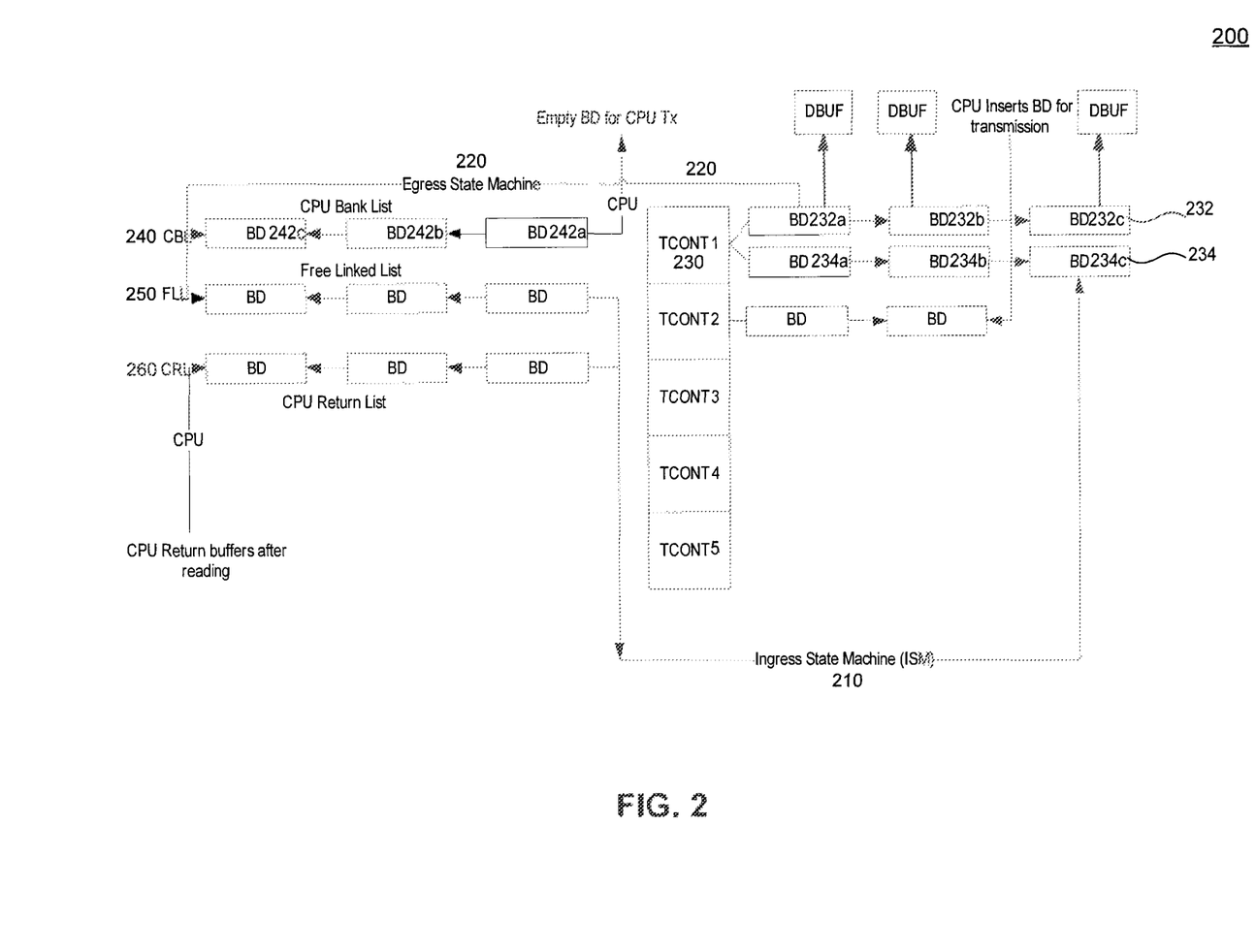
FIG. 2 illustrates example reception and transmission processes, according to an embodiment of the present disclosure.

FIG. 2 illustrates example reception and transmission processes implemented by ISM 210 and ESM 220, according to an embodiment of the present disclosure. ISM 210 and ESM 220 are provided for the purpose of illustration only and not intended to limit. In the example system 200 shown in FIG. 2, there are five transmit queues TCONT1 to TCONT5, which are associated with one or more transmit queues linked list buffers. For example, transmit queue TCONT1 230 contains a transmit queues linked list buffer 232, which is a recursive data structure of three ordered elements, such as Buffer Descriptors (BDs) 232(a)-(c). The order of the elements can be determined by a pointing relation among them. BD 232a points to BD 232b and BD 232b in turn points to BD 232c. In addition, each BD in transmit queues linked list 232 point to a memory space called Data Buffer (DBUF), which represents a memory address of payload data contained in the packet to be transmitted.

FIG. 2 further illustrates, for example, three free linked list buffers CPU Bank List (CBL) 240, Free Linked List (FLL) 250 and CPU Return List (CRL) in system 200. The names of the transmit queues linked list buffers and free linked list buffers, as well as the number of linked list buffers are for illustration purpose only, and not intended to limit.

ISM 210 and ESM 220 are independent of each other, which may operate on a different port of the PRAM (Phase-change RAM) implemented as DPR (DMA Protected Range). According to an embodiment, ISM 210 processes the last BD 232(c) in transmit queues linked list buffer 232, while ESM 220 accesses the first BD 232(a) from the head of the same transmit queues linked list buffer 232. In a reception process, ISM 210 may extract a free buffer from a head of free linked list buffer FLL 250, fill the extracted buffer with packet data and insert the full buffer BD into a tail of transmit queues linked list buffer 234c. Conversely, in a transmission process, ESM 220 may transmit data from the first BD 232a of transmit queues linked list buffer 232, extract the buffer from transmit queues linked list buffer 232, and insert the empty buffer back into BD 240c in the tail of free linked list buffer CBL 240. Accordingly, data transfer process can be reduced to a single move BD operation that transfers BD from the head of one linked list buffer to the tail of another linked list buffer.

Figure 3:
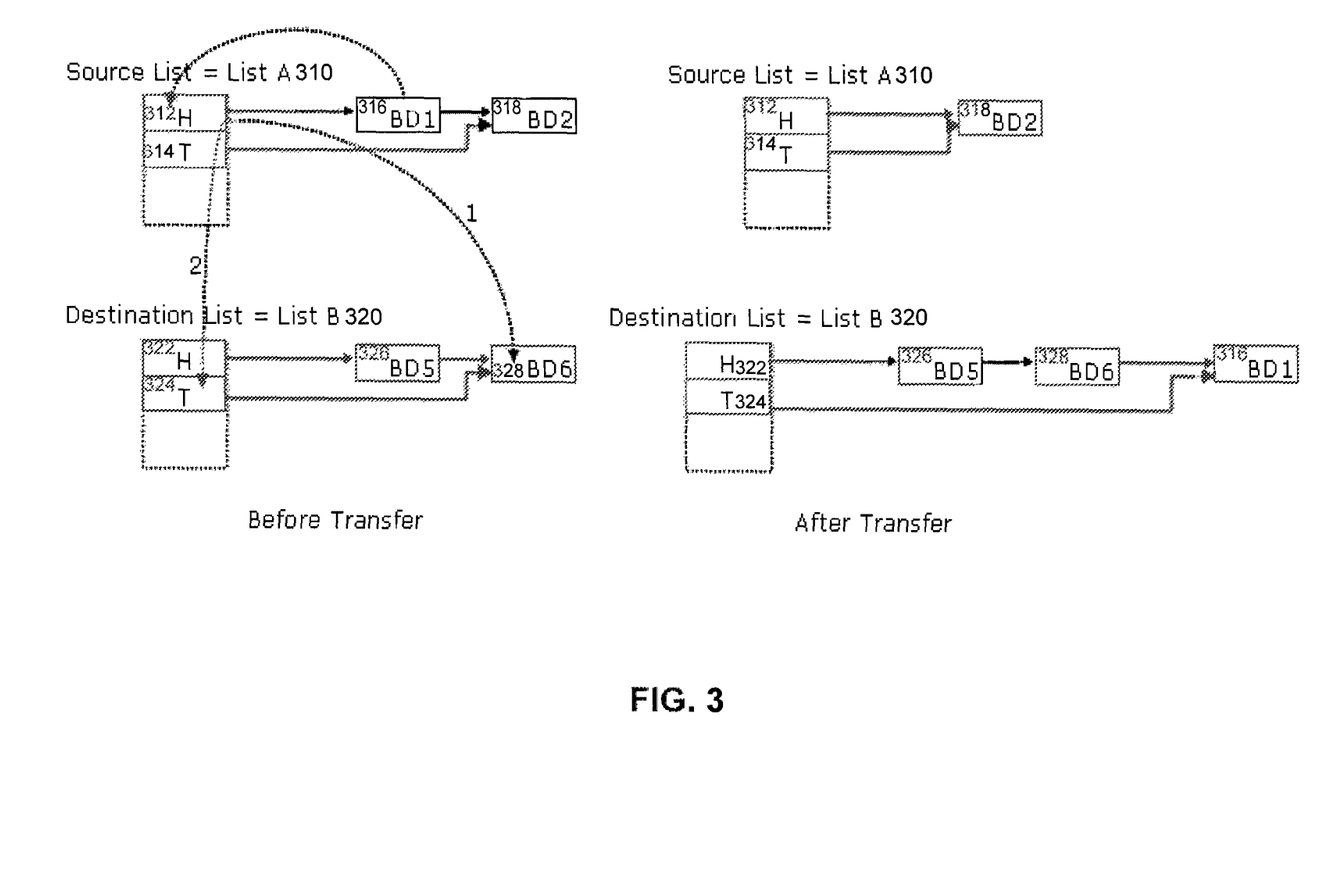
FIG. 3 illustrates an example BD move operation, according to an embodiment of the present disclosure.

FIG. 3 illustrates an example move BD operation, according to an embodiment of the present disclosure. In this example, a move DB operation can be a basic operation that transfers BD1 316 from the head of list A 310 to the tail of list B 320. As illustrated in FIG. 3, source list A 310 contains a HEAD pointer 312 which points to the first element BD1 316 of list A 310 and a TAIL pointer 314 which points to the last element BD2 318 of list A 310. BD1 316 further contains a pointer pointing to the next element BD2 318 of list A 310. Likewise, destination list B 320 contains a HEAD pointer 322 pointing to the first element BD5 326 of list B 320 and a TAIL pointer 324 pointing to the last element BD6 328 of list B 320. BD5 326 further contains a pointer pointing to the next element BD6 328 of list B 320.

Table 1 illustrates the primitive operations composing the move BD operation, according to an embodiment:

| R/W operation # | Reference to plot | Description |
| --- | --- | --- |
| 1 | 1.1 | Read A.H |
| 2 | 1.2 | Read B.T |
| 3 | 1.3 | Write A.H -> (B.T) |
| 4 | 2.1 | Write A.H -> B.T |
| 5 | 3.1 | Read (A.H) |
| 6 | 3.2 | Write (A.H) -> A.H |

In this embodiment, during the move BD operation, ISM 210 or ESM 220 may read HEAD pointer 312 of list A 310 to retrieve the memory address of the first element BD1 316 of source list A 310. ISM 210 or ESM 220 may further read TAIL pointer 324 of list B 320 to retrieve the memory address of the last element BD6 328 of destination list B 320. Subsequently, the memory address of BD1 316 maybe written to TAIL pointer 324 of list B 320 and TAIL pointer 324 now points to BD1 316. Furthermore, the memory address of the BD2 318 is retrieved at the head of list A 310, and the HEAD pointer 312 is updated to point to BD2 318 of list A 310.

As a result of the move BD operation described in FIG. 3, source list A 310 contains one element BD2 318, with HEAD pointer 312 and TAIL pointer 314 both pointing to BD2 318. In contrast, destination list B 320 contains three elements BD5 326, BD5 328 and BD1 316, with HEAD pointer 322 pointing to BD5 326 and TAIL pointer 324 pointer to BD1 316. Accordingly, ISM 210 or ESM 220 can accomplish the task of transferring BD1 316 from the head of source list A 310 to the tail of target list B 320.

For purposes of this discussion, the terms "ISM" and "reception machine," "ESM" and "transmission machine" may be used interchangeably. The terms "module" or "machine" shall be understood to include at least one of software, firmware, and hardware (such as one or more circuits, microchips, or devices, or any combination thereof), and any combination thereof. In addition, it will be understood that each module or machine can include one, or more than one, component within an actual device, and each component that forms a part of the described module can function either cooperatively or independently of any other component forming a part of the module. Conversely, multiple modules or machines described herein can represent a single component within an actual device. Further, components within a module or machine can be in a single device or distributed among multiple devices in a wired or wireless manner.

FIGS. 4A-E illustrate an example transformation of transmit queues linked list buffer, according to an embodiment of the present disclosure. Example transmit queues linked list buffer 400 is provided for the purpose of illustration and is not limiting of embodiments. As described in an embodiment of FIG. 4A, transmit queues linked list buffer 400 is initialized with a HEAD pointer 401, a TAIL pointer 402, and a NULLBD pointer 403. According to this embodiment, at the time of initialization, transmit queues linked list buffer 400 may only contain one element—a null Buffer Descriptor (NullBD) 405 which does not point to any memory address. A flag, FBN 404 may be set to 1 to indicate that HEAD pointer 401 points to NullBD 405. Notably, NULLBD pointer is not associate with any BD and thus points no where at initialization.

Figure 4A:
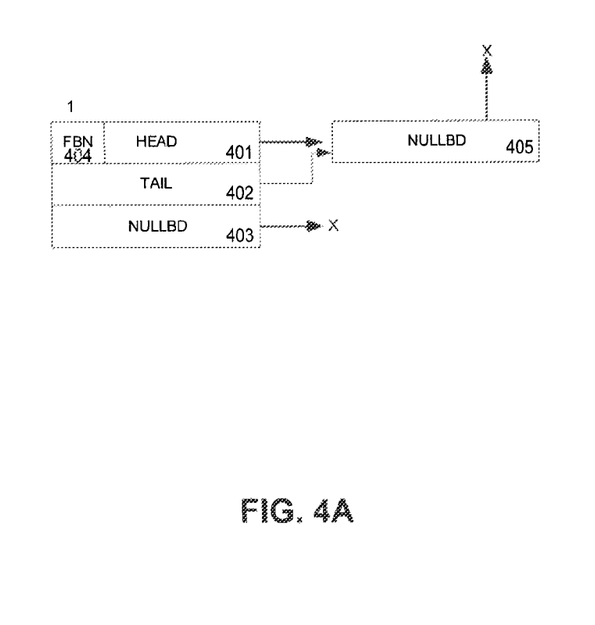
FIGS. 4A-E illustrate an example transmit queues linked list buffer, according to an embodiment of the present disclosure.
Figure 4B:
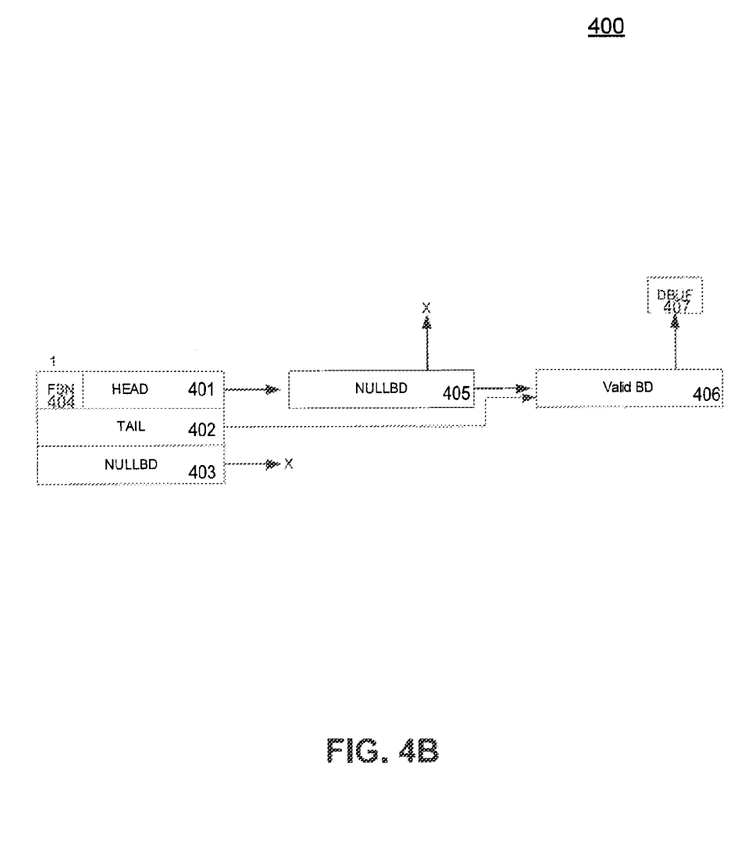

According to an embodiment illustrated in FIG. 4B, upon an arrival of a new packet for transmission, transmit queues linked list buffer 400 undergoes further transformation. For example, ESM 220 may insert the new packet into the tail of transmit queues linked list buffer 400 via an "insert BD" operation, regardless the first element in transmit queues linked list buffer 400 is null or not. As shown in FIG. 4B, a new packet valid BD 406 is inserted into the tail of transmit queues linked list buffer 400, with valid BD 406 pointing to DBUF 407, which represents a memory address of payload data contained in the new packet to be transmitted. Accordingly, HEAD pointer 402 still points to NULLBD 405, while the TAIL pointer 402 points to valid BD 406. Similar to the illustration in FIG. 4A, FDN 404 equals to 1, indicating the first element of transmit queues linked list buffer 400 is a NullBD 405. At this stage, NULL BD pointer has not attached to any BD and thus points to nowhere.

Figure 4C:
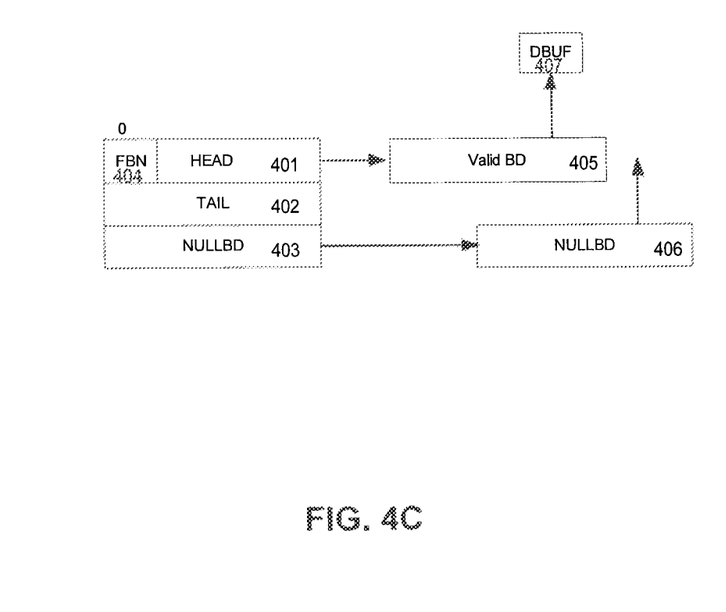

In FIG. 4C, transmit queues linked list buffer 400 may go through further transformation upon the transmission of the new packet. According to an embodiment, NULLBD pointer now hangs on NullBD pointer. Valid BD 406, the previously second element in transmit queues linked list buffer 400 is moved to the head of the queue and is being transmitted. Thus, HEAD pointer 401 is pointing to validBD 405 and NULLBD pointer 403 is pointing to NullBD 405. In addition, FBD 404 is cleared and set to 0, indicating the first BD in transmit queues linked list buffer 400 is now a valid BD representing payload data in the packet being transmitted.

Figure 4D:
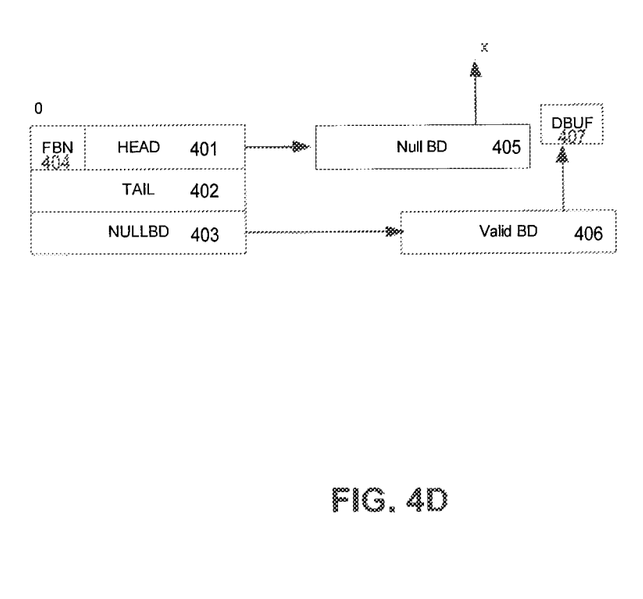

FIG. 4D illustrates additional transformation of transmit queues linked list buffer 400 after transmission of the packet, according to an embodiment. For example, after the transmission of valid BD 406 the empty DBUF pointer 407 is copied to the previously NullBD 405 and the previously valid BD 406 turns into a null BD state. Consequently, NULLBD pointer 403 is now pointing to valid BD 406 and HEAD pointer 401 is pointing to NullBD 405. FBN flag is also reset to 0 to indicate the first element in transmit queues linked list buffer 400 is NullBD 405.

Figure 4E:
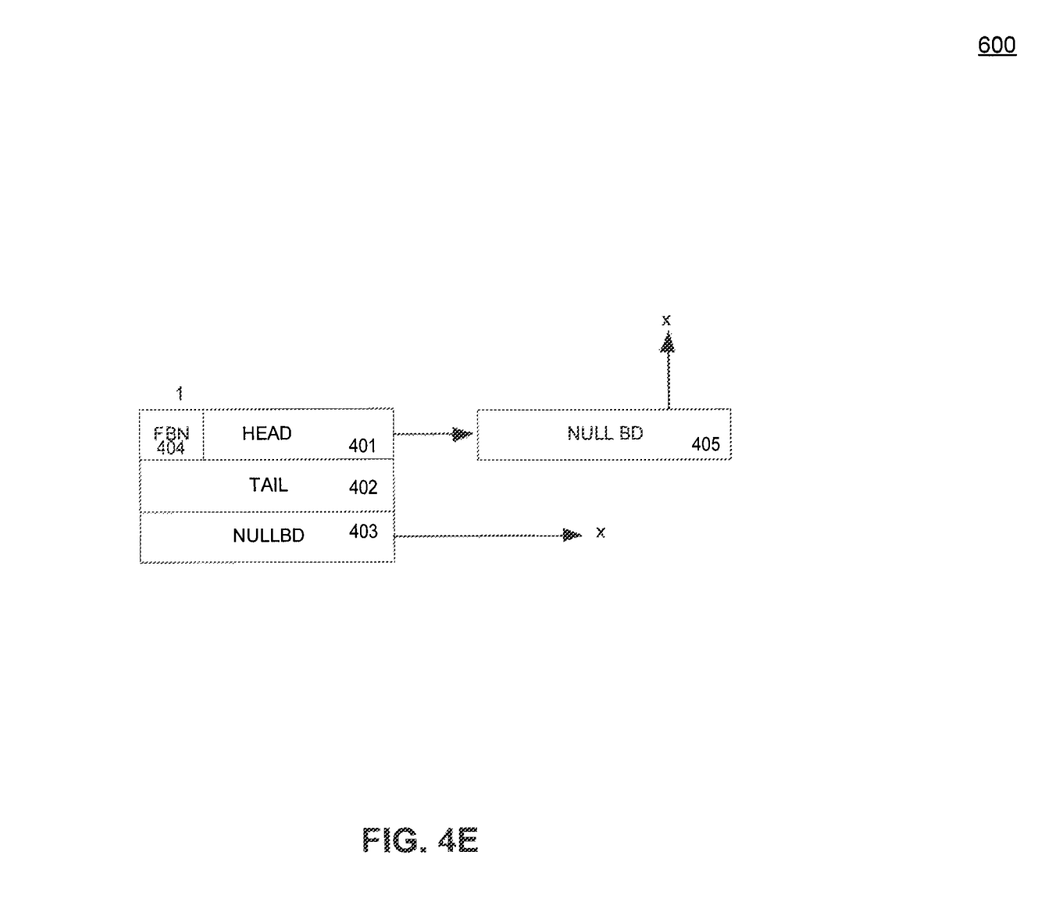

Finally, in the example of FIG. 4E, valid BD 406 that contains an empty DBUF 407 is transferred to a free linked list buffer and capable of receive another data packet into its free space. As shown in FIG. 4E, the first element of transmit queues linked list buffer 400 is declared "null" and HEAD pointer 401 points to NullBD 405, which in turn points to no memory address. Furthermore, NULLBD pointer 403 points to no where and FBN is set to 1 to indicate the first element of transmit queues linked list buffer 400 is null. Accordingly, transmit queues linked list buffer 400 is transformed to its original state as illustrated in FIG. 4A.

III. Methods

Figure 5:
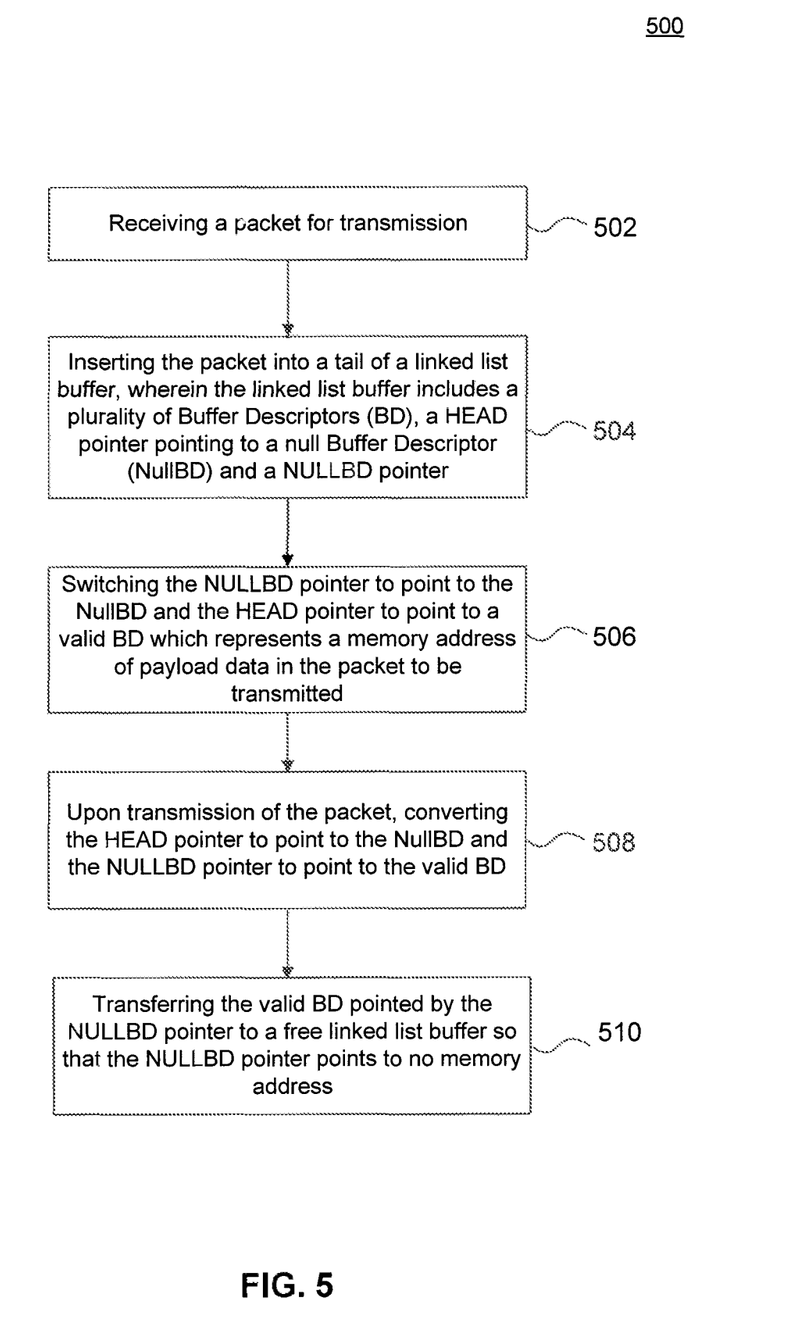
FIG. 5 is a flowchart of an example process according to an embodiment of the present disclosure.

FIG. 5 is a flowchart of an example process 500 according to an embodiment of the present disclosure. For ease of explanation, process 500 will be described with respect to ISM 210 and ESM 220 of FIG. 2, and transmit queues linked list buffer of FIG. 4, as described above. However, process 500 is not intended to be limited thereto. At stage 502, a packet is received for transmission. For example, reception machine or ISM 210 may receive the packet for transmission.

At stage 504, the packet is inserted into a tail of a linked list buffer, and the linked list buffer includes a plurality of Buffer Descriptors (BD), a HEAD pointer pointing to a null Buffer Descriptor (NullBD) and a NULLBD pointer. For example, reception machine or ISM 210 inserts the new packet into the tail of a transmit queues linked list buffer 400. Stage 504 can be further illustrated in the reception process described in FIG. 7.

Figure 7:
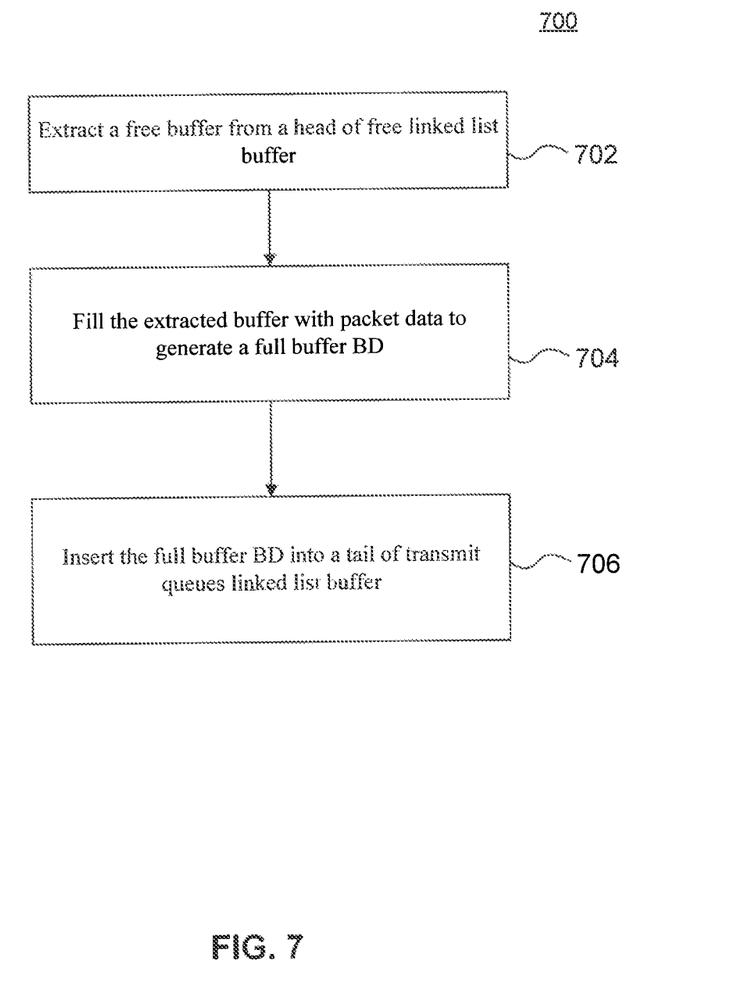
FIG. 7 is a flowchart of an example reception process, according to an embodiment of the present disclosure.

FIG. 7 is a flowchart of an example reception process 700, according to an embodiment of the present disclosure. For ease of explanation, process 700 will be described with respect to ISM 210 of FIG. 2, as described above. However, process 700 is not intended to be limited thereto. According to an embodiment, the reception process starts at stage 702, where a free buffer is extracted from a head of free linked list buffer. For example, as shown in FIG. 2, ISM 210 extracts a free buffer from a head of FLL 250.

The reception process proceeds to stage 704, and the extracted buffer is filled with packet data to generate a full buffer BD. For example, ISM 210 receives the packet to be transmitted at stage 502. Subsequently, ISM 210 fills the extracted free buffer from FLL 250 with payload data contained in the packet to generate a full buffer BD. Equipped with the full buffer BD, the reception process continues at its final stage.

At stage 706, the full buffer BD is inserted into a tail of transmit queues linked list buffer. For example, ISM 210 inserts a full buffer BD 234c into the tail of TCONT 1 transmit queues linked list buffer 234, which concludes the reception process.

Now referring back to FIG. 5, stage 506 launches the transmission process, where the NULLBD pointer is switched to point to the NullBD and the HEAD pointer to point to a valid BD which represents a memory address of payload data in the packet to be transmitted. For example, transmission machine or ESM 220 switches the pointers so that NullBD 405 is hanged on NULLBD pointer and HEAD pointer 401 points to valid BD 406.

Upon transmission of the packet at stage 508, HEAD pointer points to the NullBD and the NULLBD pointer points to the valid BD. For example, transmission machine or ESM 220 converts HEAD pointer 401 to point to NullBD 405 and NULLBD pointer 403 points to valid BD 406.

At stage 510, the valid BD pointed by the NULLBD pointer is transferred to a free linked list buffer so that the NULLBD pointer points to no memory address. For example, transmission machine or ESM 220 transfers valid BD 206 that contains an empty DBUF 207 to a free linked list buffer. As a result, HEAD pointer 401 may point to NullBD 305 and NULLBD pointer 403 may point to no where, restoring transmit queues linked list buffer to its original state.

Process 500 may be performed by an Optical Network Unit (ONU), such as ONUs 110a and 110b in an upstream communication in an XGPON, according to an embodiment. The XGPON may include a free linked list buffer having a plurality of free buffers. The XGPON may also include a transmit queues linked list buffer having a plurality of Buffer Descriptors (BD), a HEAD pointer pointing to a null Buffer Descriptor (NullBD) and a NULLBD pointer. A reception machine maybe configured to receive a packet for transmission from an Optical Line Terminal (OLT) and insert the packet into a tail of the transmit queues linked list buffer. A transmission machine may be configured to switch the NULLBD pointer to point to the NullBD and the HEAD pointer to point to a valid BD which represents a memory address of payload data in the packet to be transmitted. Upon transmission of the packet, the transmission machine may convert the HEAD pointer to point to the NullBD and the NULLBD pointer to point to the valid BD. The transmission machine may finally transfer the valid BD pointing by the NULLBD pointer to the free linked list buffer so that the NULLBD pointer points no memory address.

IV. Example Computer Implementation

Figure 6:
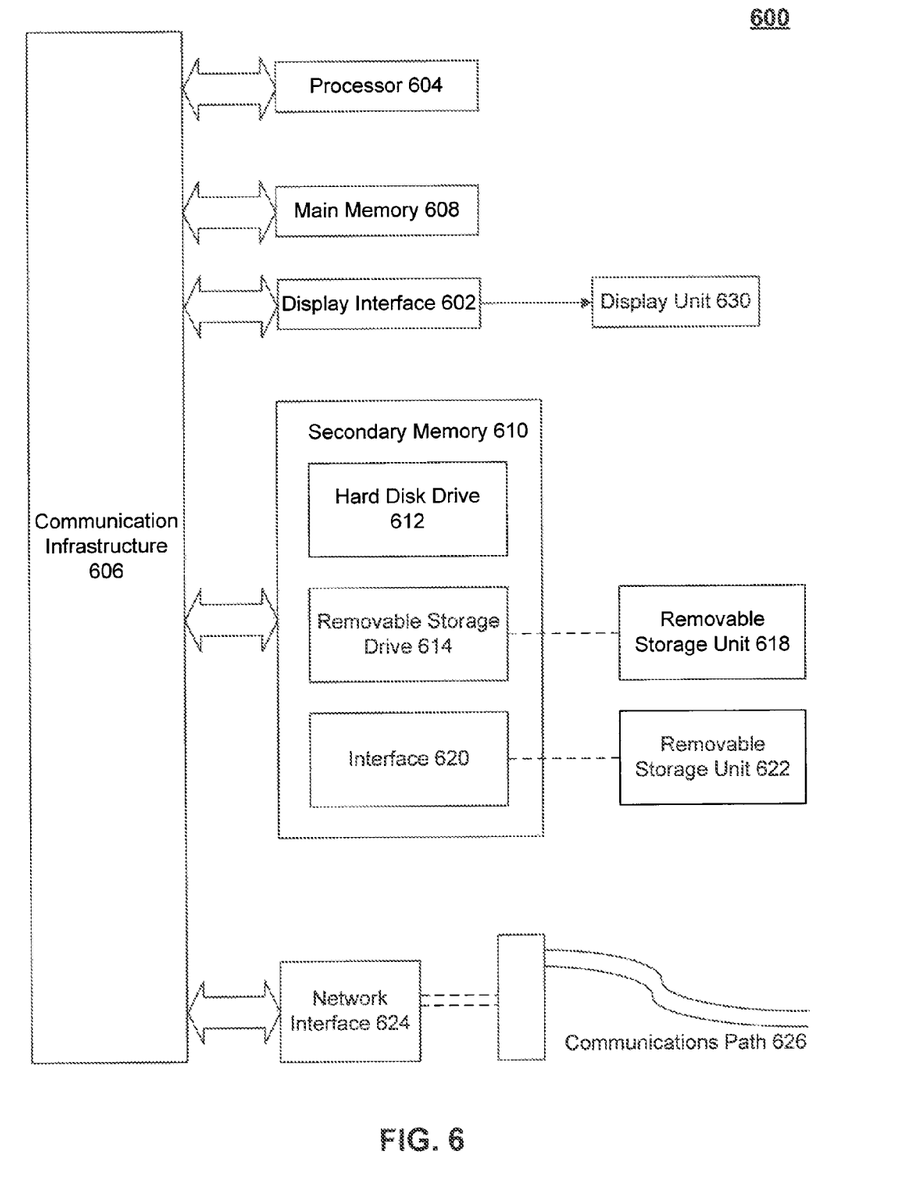
FIG. 6 is an example computer system in which embodiments of the present disclosure can be implemented.

Various aspects of the present disclosure can be implemented by software, firmware, hardware, or a combination thereof. FIG. 6 illustrates an example computer system 600 in which the present disclosure, or portions thereof, can be implemented as computer-readable code. For example, ISM 210 and ESM 220 in FIG. 2 and the processes in FIG. 5 can be implemented in system 600. Various embodiments of the invention are described in terms of this example computer system 600. After reading this description, it will become apparent to a person skilled in the relevant art how to implement the invention using other computer systems and/or computer architectures.

Computer system 600 includes one or more processors, such as processor 604. Processor 604 can be a special purpose or a general purpose processor. Processor 604 is connected to a communication infrastructure 606 (for example, a bus or network).

Computer system 600 also includes a main memory 608, preferably random access memory (RAM), and may also include a secondary memory 610. Secondary memory 610 may include, for example, a hard disk drive 612, a removable storage drive 614, and/or a memory stick. Removable storage drive 614 may comprise a floppy disk drive, a magnetic tape drive, an optical disk drive, a flash memory, or the like. The removable storage drive 614 reads from and/or writes to a removable storage unit 615 in a well-known manner. Removable storage unit 615 may comprise a floppy disk, magnetic tape, optical disk, etc. that is read by and written to by removable storage drive 614. As will be appreciated by persons skilled in the relevant art(s), removable storage unit 615 includes a computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units such as removable storage unit 622 and interfaces such as interface 620 that allow software and data to be transferred from the removable storage unit 622 to computer system 600.

Computer system 600 may also include a communications interface 624. Communications interface 624 allows software and data to be transferred between computer system 600 and external devices. Communications interface 624 may include a modem, a network interface (such as an Ethernet card), a communications port, a PCMCIA slot and card, or the like. Software and data transferred via communications interface 624 are in the form of signals that may be electronic, electromagnetic, optical, or other signals capable of being received by communications interface 624. These signals are provided to communications interface 624 via a communications path 626. Communications path 626 carries signals and may he implemented using wire or cable, fiber optics, a phone line, a cellular phone link, an RF link or other communications channels, In this document, the terms "computer program medium" and "computer usable medium" are used to generally refer to media such as removable storage unit 615, removable storage unit 622, and a hard disk installed in hard disk drive 612. Signals carried over communications path 626 can also embody the logic described herein. Computer program medium and computer usable medium can also refer to memories, such as main memory 608 and secondary memory 610, which can be memory semiconductors (e.g. DRAMs, etc.). These computer program products are means for providing software to computer system 600.

Computer programs (also called computer control logic) are stored in main memory 608 and/or secondary memory 610. Computer programs may also be received via communications interface 624. Such computer programs, when executed, enable computer system 600 to implement the present invention as discussed herein, in particular, the computer programs, when executed, enable processor 604 to implement the processes of the present invention, such as the steps in the methods illustrated by flowcharts 200 of FIG. 2 and 300 of FIG. 3, discussed above. Accordingly, such computer programs represent controllers of the computer system 600. Where the invention is implemented using software, the software may be stored in a computer program product and loaded into computer system 600 using removable storage drive 614, interface 620, hard drive 612 or communications interface 624.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

V. Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method, comprising:
    receiving a packet for transmission;
    inserting the packet into a tail of a linked list buffer, wherein the linked list buffer includes a plurality of Buffer Descriptors (BDs), a HEAD pointer pointing to a null Buffer Descriptor (NullBD) and a NULLBD pointer;
    switching the NULLBD pointer to point to the NullBD and the HEAD pointer to point to a valid BD which represents a memory address of payload data in the packet to be transmitted; and
    upon transmission of the packet, converting the HEAD pointer to point to the NullBD and the NULLBD pointer to point to the valid BD.

2. The method of claim 1, further comprising:
    transferring the valid BD pointed by the NULLBD pointer to a free linked list buffer so that the NULLBD pointer points to no memory address.

3. The method of claim 2, further comprising:
    extracting a free buffer from a free linked list buffer pool; and
    filling the extracted free buffer with data in the packet to be transmitted to generate a full buffer.

4. The method of claim 3, further comprising:
    inserting the full buffer into the linked list buffer for transmission.

5. The method of claim 3, further comprising:
    transmitting data in the full buffer of the linked list buffer, wherein the full buffer resides in a head of the linked list buffer;
    extracting the full buffer from the head of the linked list buffer; and
    inserting the full buffer into a tail of the free linked list buffer pool.

6. The method of claim 2, further comprising:
    transmitting the valid BD from a head of the linked list buffer to a tail of a free linked list buffer pool.

7. The method of claim 1, further comprising:
    initiating the linked list buffer with the HEAD pointer pointing to the NullBD and the NULLBD pointer pointing to no memory address.

8. The method of claim 1, wherein the linked list buffer further includes a flag to indicate whether the HEAD pointer points to the NullBD.

9. A method for data transmission by an Optical Network Unit (ONU), comprising:
- receiving a packet from an Optical Line Terminal (OLT);
- inserting the packet into a tail of a linked list buffer, wherein the linked list buffer includes a plurality of Buffer Descriptors (BDs), a HEAD pointer pointing to a null Buffer Descriptor (NullBD) and a NULLBD pointer;
- switching the NULLBD pointer to point to the NullBD and the HEAD pointer to point to a valid BD which represents a memory address of payload data in the packet to be transmitted; and
- upon transmission of the packet, converting the HEAD pointer to point to the NullBD and the NULLBD pointer to point to the valid BD.

10. The method of claim 9, further comprising:
- transferring the valid BD pointed by the NULLBD pointer to a free linked list buffer pool so that the NULLBD pointer points to no memory address.

11. A system, comprising:
- a reception machine configured to:
  - receive a packet for transmission; and
  - insert the packet into a tail of a transmit queues linked list buffer, wherein the transmit queues linked list buffer has a plurality of Buffer Descriptors (BDs), a HEAD pointer pointing to a null Buffer Descriptor (NullBD) and a NULLBD pointer;
- a transmission machine configured to:
  - switch the NULLBD pointer to point to the NullBD and the HEAD pointer to point to a valid BD which represents a memory address of payload data in the packet to be transmitted; and
  - upon transmission of the packet, convert the HEAD pointer to point to the NullBD and the NULLBD pointer to point to the valid BD.

12. The system of claim 11 wherein the transmission machine is further configured to:
- transfer the valid BD pointing by the NULLBD pointer to a free linked list buffer so that the NULLBD pointer points to no memory address.

13. The system of claim 12, wherein the reception machine is further configured to:
- extract a free buffer from a free linked list buffer pool; and
- fill the extracted free buffer with data in the packet to be transmitted to generate a full buffer.

14. The system of claim 13, wherein the reception machine is further configured to:
- insert the full buffer into the transmit queues linked list buffer for transmission.

15. The system of claim 13, wherein the transmission machine is further configured to:
- transmit data in the full buffer of the transmit queues linked list buffer, wherein the full buffer resides in a head of the transmit queues linked list buffer;
- extract the full buffer from the head of the transmit queues linked list buffer; and
- insert the full buffer into the tail of the free linked list buffer pool.

16. The system of claim 12, wherein the transmission machine is further configured to:
- transmit the valid BD from a head of the transmit queues linked list buffer to a tail of a free linked list buffer pool.

17. The system of claim 11, wherein the transmission machine is further configured to:
- initiate the transmit queues linked list buffer with the HEAD pointer pointing to the NullBD and the NULLBD pointer pointing to no data buffer in a memory space.

18. The system of claim 11, wherein the transmit queues linked list buffer further includes a flag to indicate whether the HEAD pointer points to the NullBD.

19. A system for data transmission by an Optical Network Unit (ONU), comprising:
- a reception machine configured to:
  - receive a packet for transmission from an Optical Line Terminal (OLT); and
  - insert the packet into a tail of a transmit queues linked list buffer, wherein the transmit queues linked list buffer has a plurality of Buffer Descriptors (BDs), a HEAD pointer pointing to a null Buffer Descriptor (NullBD) and a NULLBD pointer; and
- a transmission machine configured to:
  - switch the NULLBD pointer to point to the NullBD and the HEAD pointer to point to a valid BD which represents a memory address of payload data in the packet to be transmitted;
  - upon transmission of the packet, convert the HEAD pointer to point to the NullBD and the NULLBD pointer to point to the valid BD; and
  - transfer the valid BD pointing by the NULLBD pointer to a free linked list buffer so that the NULLBD pointer points to no memory address.

20. A non-transitory computer-readable storage device having computer-executable instructions stored thereon, execution of which, by a computing device, causes the computing device to perform operations comprising:
- receiving a packet for transmission;
- inserting the packet into a tail of a linked list buffer, wherein the linked list buffer includes a plurality of Buffer Descriptors (BDs), a HEAD pointer pointing to a null Buffer Descriptor (NullBD) and a NULLBD pointer;
- switching the NULLBD pointer to point to the NullBD and the HEAD pointer to point to a valid BD which represents a memory address of payload data in the packet to be transmitted;
- upon transmission of the packet, converting the HEAD pointer to point to the NullBD and the NULLBD pointer to point to the valid BD; and
- transferring the valid BD pointing by the NULLBD pointer to a free linked list buffer so that the NULLBD pointer points to no memory address.

* * * * *